(12) United States Patent
Freytsis et al.

(10) Patent No.: US 7,411,971 B2
(45) Date of Patent: Aug. 12, 2008

(54) SYSTEMS AND METHODS FOR THE SCHEDULE ALIGNMENT OF PACKET FLOW

(75) Inventors: Ilya Freytsis, Swampscott, MA (US); Paul T. Sprague, North Berwick, ME (US); James P. Towey, Jr., Sandwich, MA (US)

(73) Assignee: Avaya Inc., Basking Ridge, NJ (US)

( * ) Notice: Subject to any disclaimer, the term of this patent is extended or adjusted under 35 U.S.C. 154(b) by 660 days.

(21) Appl. No.: 10/936,881

(22) Filed: Sep. 9, 2004

(65) Prior Publication Data

US 2005/0111362 A1    May 26, 2005

Related U.S. Application Data

(60) Provisional application No. 60/501,391, filed on Sep. 9, 2003.

(51) Int. Cl.
 *H04L 12/54* (2006.01)
(52) U.S. Cl. .................. 370/429; 370/235; 370/352; 370/428
(58) Field of Classification Search .......... 370/230, 370/230.1, 232, 235, 395.21, 395.41, 395.43, 370/352–356, 398, 394, 395.4, 412, 413, 370/428, 429
 See application file for complete search history.

(56) References Cited

U.S. PATENT DOCUMENTS

| 5,291,481 | A | * | 3/1994 | Doshi et al. ............ 370/230 |
| 6,347,085 | B2 | | 2/2002 | Kelly ..................... 370/352 |
| 6,452,915 | B1 | | 9/2002 | Jorgensen ............... 370/338 |

(Continued)

FOREIGN PATENT DOCUMENTS

EP    1035751 A2 *    9/2000

(Continued)

OTHER PUBLICATIONS

Gupta, P. et al., "Classifying Packets with Hierarchical Intelligent Cuttings," IEEE Micro. Jan.-Feb. 2000, vol. 20, iss. 1, pp. 34-41.*

(Continued)

*Primary Examiner*—Chi H. Pham
*Assistant Examiner*—Donald L Mills
(74) *Attorney, Agent, or Firm*—Chapin IP Law, LLC; Barry W. Chapin, Esq.

(57) ABSTRACT

A classification mechanism automatically aligns time-sensitive data streams to sequences (schedules), according to information in the packets or other information and classification criteria specified by a human network administrator, a sequence agent, an application program or otherwise. When a packet arrives at a first sequence-aware switch along a path, the packet is aligned to a new or existing sequence. When a new sequence is established, appointments are reserved at sequence-aware switches along the path. The packet is placed in a queue, based on its classification. When the packet reaches the head of the queue, at that queue's appointment time, the switch forwards the packet along the path. If possible, appointments have been reserved at subsequent switches along the packet's path, so the packet can be forwarded through the subsequent switches without delay. Packets that do not match any classification criteria are handled on a best-effort basis.

34 Claims, 3 Drawing Sheets

U.S. PATENT DOCUMENTS

| | | | |
|---|---|---|---|
| 6,515,963 B1 | 2/2003 | Bechtolsheim et al. | 370/229 |
| 6,538,989 B1 * | 3/2003 | Carter et al. | 370/229 |
| 6,577,596 B1 * | 6/2003 | Olsson et al. | 370/230 |
| 6,707,821 B1 * | 3/2004 | Shaffer et al. | 370/395.4 |
| 2002/0136217 A1 * | 9/2002 | Christensen | 370/393 |
| 2004/0063497 A1 * | 4/2004 | Gould | 463/42 |

FOREIGN PATENT DOCUMENTS

| | | |
|---|---|---|
| WO | WO 9848535 A1 * | 10/1998 |

OTHER PUBLICATIONS

Lai, Ming-Yi et al., "An Adaptation Scheme for Real-Time Video Streaming," IEEE International Symposium on Circuits and Systems. ISCAS 2002. May 2002, vol. 2, pp. II-720-II-723.*

* cited by examiner

SYSTEMS AND METHODS FOR THE SCHEDULE ALIGNMENT OF PACKET FLOW

CROSS REFERENCE TO RELATED APPLICATIONS

This application claims the benefit of U.S. Provisional Application No. 60/501,391, entitled "Systems and Methods for the Schedule Alignment of a Packet Flow," filed Sep. 9, 2003.

STATEMENT REGARDING FEDERALLY SPONSORED RESEARCH OR DEVELOPMENT (Not applicable)

BACKGROUND OF THE INVENTION

The present invention relates to transmission and switching of data packets through computer networks, such as scheduled packet switching systems, and more particularly to automatic scheduling of data flows.

So-called "converged" computer networks carry a mixture of traffic types, such as data, telephone (voice) and video. Some of this traffic is time-sensitive, and other of the traffic is not time-sensitive. For example, a converged local area network (LAN) can include a variety of hosts, such as workstations, IP telephones, storage servers, print servers, web servers, telephony servers (PBXs) and other endpoints. The LAN typically includes switches, routers, etc. (collectively "switches"), links between the switches and other network elements that interconnect the workstations, IP telephones, servers, etc. Timely delivery of packets that carry voice information between IP telephones and telephony servers is important to providing high-quality voice signals. Similarly, video and other time-sensitive packets must be delivered without delay. On the other hand, delays are tolerable in the delivery of normal computer data.

Some networks are operated as "real-time network scheduled packet routing systems" (or simply "scheduled networks"), so time-sensitive packets can be delivered without delay or jitter. One such system, described in U.S. Pat. No. 6,556,564, essentially reserves recurring time slots ("appointments") at "schedule-aware" switches for each time-sensitive stream of packets (called a "scheduled data flow") between a pair of endpoints. When an application program executing on a host connected to the network wishes to establish a path to another host for delivering a time-sensitive stream of packets, the application sends a request to a "scheduling agent" to establish a scheduled data flow. The path between the hosts (endpoints) includes one or more switches, a respective link between each pair of switches along the path and ingress and egress ports where the links terminate at the switches. The switches forward packets received on the ingress ports to the egress ports. A network can carry many crisscrossed scheduled data flow paths.

Each egress port has an associated schedule, in which individual repeating appointments can be made to reserve the egress port on a periodic basis for a particular scheduled data flow between a particular pair of endpoints. Reserving the egress port also reserves resources (within the switch) that are used to pass data received on an ingress port to the egress port. The scheduling agent makes the appointments (reserves the egress ports of the switches) along the path and coordinates the times of the appointments, such that (to the extent possible) when a packet is expected to be received on an ingress port of a switch, the appropriate egress port on the switch is reserved for the scheduled data flow. Thus, the packet can be forwarded by the switch without queuing the packet within the switch. Non-scheduled traffic that would otherwise be sent out the egress port is held off (queued within the switch), so the non-scheduled traffic does not interfere with the scheduled data flow.

In an ideally scheduled path, all egress ports along the path from one endpoint to the other endpoint are scheduled such that each egress port is reserved at a time that is equal to the reservation time of the immediately preceding egress port along the path, plus propagation time of a packet from the preceding egress port. Thus, a packet can traverse the path, from one endpoint to the other endpoint, without any queuing delay within any switch along the path. Due to the sequential nature of the reservation times along the path, the term "sequence" is used synonymously with "schedule" elsewhere in this disclosure.

During appointment times that are not reserved for any scheduled data flow, and during reserved appointments during which the switch does not receive a packet of the scheduled data flow, the switch routes non-scheduled traffic on a best-effort basis, as in more traditional switches. The switches can detect unused reserved appointments. For example, if the beginning of a packet does not arrive at a switch within a predetermined amount of time after the beginning of an appointment, the switch can conclude that no scheduled packet will be received during that appointment.

Scheduled networks ensure jitter-free delivery of time-sensitive packets while providing traditional best-effort delivery of non-time-sensitive packets. However, only application programs that explicitly request scheduled data flows receive this expedited service. These application programs must, therefore, be written to make these requests. Furthermore, to make application programs potable (i.e. capable of being used with scheduled networks and more traditional networks that do not include scheduling agents and schedule-aware switches), the application programs must be written to ascertain the kind of networks they operate with and make (or not make) requests for scheduled data handling, as appropriate. In addition, the performance of many existing (legacy) application programs would be improved by utilizing scheduled data flows, but these programs lack logic to request such service.

In addition, scheduled networks, and traditional best-effort networks, cannot be heavily utilized for non-time-sensitive traffic, without queuing packets within the switches. Heavy utilization is desirable, in that it is a cost-effective use of network elements. However, the consequential packet queuing consumes resources within many or all of the switches, and it causes delays in the delivery of the packets.

Some network owners would appreciate network elements that can automatically provide scheduled data flows to time-sensitive data streams, without explicit requests to do so from application programs.

BRIEF SUMMARY OF THE INVENTION

The present invention includes methods and apparatus that can automatically align a time-sensitive data stream to a sequence (schedule), without an explicit request to do so from an application program. These methods and apparatus are applicable in networks that carry only non-time-sensitive traffic, only time-sensitive traffic or mixtures of both types of traffic.

In accordance with the present disclosure, a classification mechanism automatically identifies individual packets or data flows of packets (collectively "data flows") that should be sequenced and sequences the data flows. The data flows can be classified according to information in the packets or other information. Classification criteria can be specified by a human network administrator, a sequence agent, an application program or otherwise. The criteria can be used to identify one or more classes of data flows. A data flow that matches some classification criteria can be aligned to an existing sequence, or a new sequence can be established for the data flow. When a new sequence is established, a sequence agent reserves appointments at sequence-aware switches along the path. Because packets in sequenced data flows incur little or no queuing in switches along their respective paths between endpoints, the now-sequenced packets move through a network more expeditiously. Packets that do not match any classification criteria are handled on a best-effort basis.

In one embodiment, the network includes sequence-aware switches and can optionally include non-sequence-aware switches. Packets of a data flow are carried from a source endpoint, over a path through the network, to a destination endpoint. When one of these packets arrives at the first sequence-aware switch along the path (or a segment of the path, as described below), the packet is classified for sequenced or non-sequenced handling. Thus, the source endpoint and source application need not request sequenced handling for this data flow. In fact, the source endpoint and source application need not even be aware that sequenced handling is available. Consequently, legacy applications can automatically benefit from this expedited handling, without modifications to the applications.

If a packet is classified for sequenced handling, the switch places the packet in an appropriate queue, based on the classification. When the packet reaches the head of the queue, at that queue's appointment time, the switch forwards the packet along the path. If possible, appointments have been reserved at subsequent switches along the packet's path, so the packet can be forwarded through the subsequent switches without delay.

If the packet subsequently reaches a non-sequenced segment of the path, i.e. a segment made up of non-sequence-aware switches, the packet is forwarded by these switches in a best-effort fashion. If the packet subsequently reaches another sequenced segment, the packet is classified, queued, etc. (as described above) again. The packet can be classified (and thus handled) differently in the second sequenced segment than in the first sequenced segment. In either case, legacy network elements, such as non-sequence-aware switches, can be combined with sequence-aware network elements in a composite network. Other features, functions and aspects of the invention will be evident from the Detailed Description of the Invention that follows.

BRIEF DESCRIPTION OF THE SEVERAL VIEWS OF THE DRAWINGS

These and other features, advantages, aspects and embodiments of the present invention will become more apparent to those skilled in the art from the following detailed description of an embodiment of the present invention when taken with reference to the accompanying drawings, in which the first digit, or first two digits, of each reference numeral identifies the figure in which the corresponding item is first introduced and in which.

DETAILED DESCRIPTION OF THE INVENTION

U.S. Provisional Application No. 60/501,391, filed Sep. 9, 2003, entitled "Systems and Methods for the Schedule Alignment of a Packet Flow," is incorporated herein by reference.

U.S. patent application Ser. No. 09/746,744, filed Dec. 22, 2000, entitled "Network Switch With Packet Scheduling," is incorporated herein by reference.

U.S. Provisional Patent Application No. 60/349,115, filed Jan. 16, 2002, entitled "System And Methods For Achieving High Availability Of Itineraries In A Real-Time Network Scheduled Packet Routing System," is incorporated herein by reference.

U.S. patent application Ser. No. 10/162,454 filed Jun. 4, 2002 entitled "Real-Time Network Scheduled Packet Routing System," is incorporated herein by reference.

U.S. Pat. No. 6,556,564, issued Apr. 29, 2003, entitled "Scheduled Internet Protocol Telephone Instrument System," is incorporated herein by reference.

U.S. patent application Ser. No. 10/900,986, filed Jul. 28, 2004, entitled "Systems and Methods for the Synchronization of a Real-Time Scheduled Packet Network Using Relative Timing," is incorporated herein by reference.

The present application discloses methods and apparatus that automatically align a time-sensitive data flow to a sequence (schedule), without an explicit request to do so from an application program. In one embodiment, the data flow is classified, based on an estimate of whether the data flow would benefit from sequenced routing through a series of switches along at least a portion of a path from a source endpoint to a destination endpoint. Classification criteria can be specified by a human network administrator, a sequence agent, an application program or otherwise. If the data flow meets some of the classification criteria, the data flow is aligned to an existing or new sequence along the path. The data flow can share a sequence with other data flows or the data flow can be allocated its own sequence. In some embodiments, network elements automatically classify data flows, as outlined above, as well as accept explicit requests from application programs for sequenced handling of their data flows, as discussed in the above-cited patents and applications.

The classification can be based on information about the data flow, such as information within packets of the data flow, information obtained by a network element about one or both endpoints or application programs at the endpoints, historical network traffic statistics or any information that can indicate whether the data flow would benefit from sequenced handling. For example, this classification can be based on: whether the protocol used within the data flow is commonly used for real-time communication or for less time-sensitive communication; a hypothesis concerning the type of application (for example, voice over IP (VoIP), video over IP, web browsing, etc.) generating the data flow; or measured parameters, such as burstiness, of the data flow, optionally as compared to quality of service (QoS) requirements (such as delay, jitter, packet loss, etc.) inferred by a network element or requested by the application.

Figure 1:
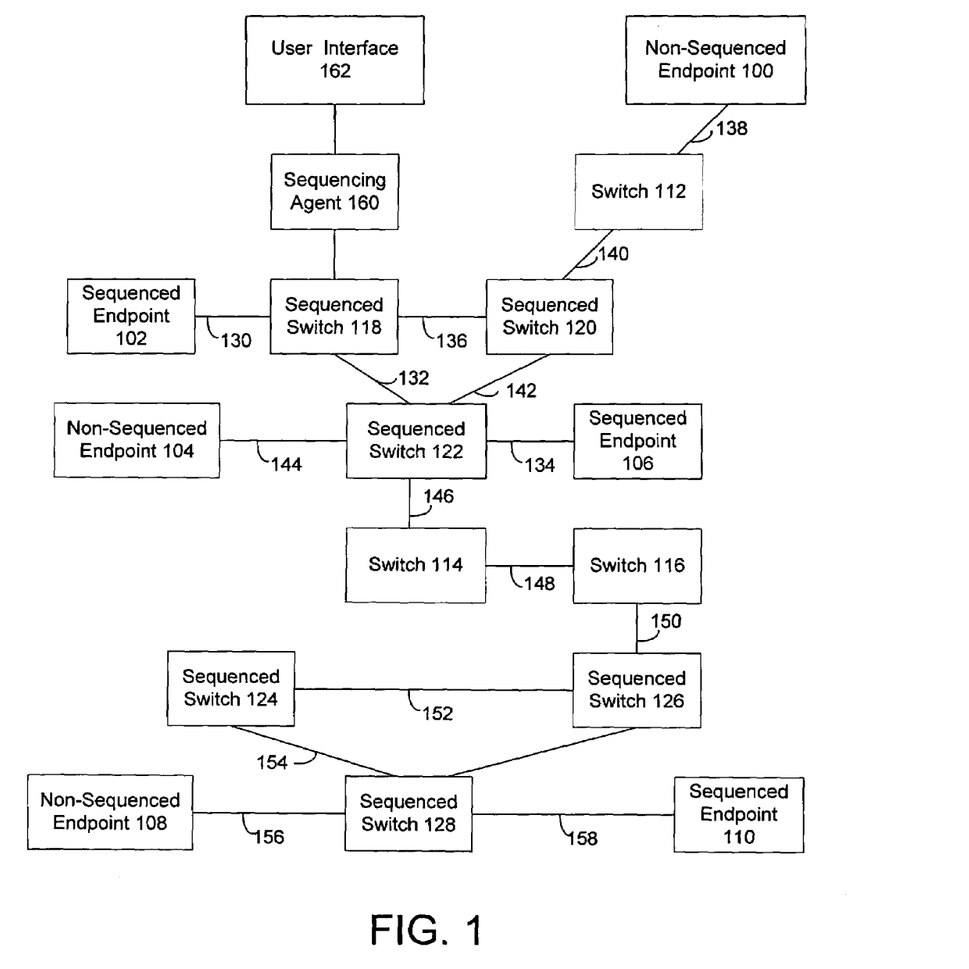
FIG. 1 is a simplified block diagram of an exemplary communications network in which an embodiment of the present invention can be practiced.

FIG. 1 illustrates an exemplary communication network in which an embodiment of the present invention can be advantageously practiced. The network includes a number of endpoints 100, 102, 104, 106, 108 and 110. Some of the endpoints are sequenced endpoints, such as sequenced endpoints 102, 106 and 110. Other of the endpoints can be non-sequenced endpoints, such as non-sequenced endpoints 100, 104, and 108. The endpoints 100-110 are interconnected by a combination of (non-sequenced) switches 112, 114 and 116 and sequenced switches 118, 120, 122, 124, 126 and 128, as well as a number of links, such as links 130-158.

The sequenced switches 118-128 process packet flows based on scheduled arrival times, as discussed in the above-cited patents and applications and as summarized below. An endpoint, for example sequenced endpoint 102, can initiate a data flow to one or more other sequenced endpoints, such as sequenced endpoint 106. The initiating sequenced endpoint 102 sends a request to a sequencing agent 160 to establish a sequenced path between the endpoints 102 and 106. The sequencing agent 160 selects a contiguous set of links, for example links 130, 132 and 134, for a path between the endpoints 102 and 106. The sequencing agent 160 schedules appointments at egress ports (not shown) on the sequenced switches 118 and 122 that correspond to the links 132 and 134, respectively, of the path. This processes is referred to as "sequencing."

Each egress port on each sequenced switch 118-128 repeatedly executes a "schedule," which represents a fixed amount of time or a fixed amount of data flow through the port. For example, a port can repeatedly cycle through a 20 mSec. schedule. Each schedule is partitioned into a set of appointments. For example, a 20 mSec. schedule on a 100 Mb/Sec. port can be partitioned into 1000 250-byte appointments. Appointments can, however, vary in size. Scheduling an appointment on a port reserves the port for a particular sequenced data flow at the appointment time during each subsequent 20 mSec. schedule, until the appointment is canceled.

Each appointment is a placeholder for one or more data packets. Sequenced switches 118-128 in the network are synchronized, such as to a common clock, and all these switches and the links interconnecting them cycle through their appointment schedules. Clocks in the sequenced switches 118-128 (and optionally the sequenced endpoints 102, 106 and 110) can be synchronized by distributing "heart beat" synchronization packets, as described in U.S. patent application Ser. No. 10/900,986. For example, a "master" switch or other central time source can send the heart beat packets down a tree structure that includes the sequenced switches 118-128 and the sequenced endpoints 102, 106 and 110. The frequency at which the heart beat packets arrive at the sequenced switches 118-128 and the sequenced endpoints 102, 106 and 110 can be used to set local frequency references (clocks) in the switches and endpoints, such as through the use of digital phase-lock loops. As each scheduled packet in a data flow arrives at a sequence-aware switch 118-128, the switch transmits the packet on the appropriate outbound port at the designated appointment time, i.e. according to the port's schedule.

The sequencing agent 160 makes the appointments (reserves the egress ports of the sequenced switches 118-128) along the path and coordinates the times of the appointments, such that (to the extent possible) when a packet is expected to be received on an ingress port of a sequenced switch 118-128, the appropriate egress port on the switch is reserved for the sequenced data flow. Thus, the packet can be forwarded by the sequenced switch 118-128 without queuing the packet within the switch. When selecting the time for the egress port appointment, the sequencing agent 160 considers link transport delays, i.e. the delay between the time the packet is sent out the egress port of the previous sequenced switch 118-128 along the path and the time the packet arrives at the current switch and is ready to be forwarded out the egress port of the current switch. Thus, ideally, as soon as a packet begins accumulating at the sequenced switch's 118-128 ingress port, the packet is cut through to its appointment on the egress port.

Non-sequenced traffic that would otherwise be sent out the egress port is held off (queued within the sequenced switch 118-128), so this traffic does not interfere with the sequenced data flow. However, as soon as the scheduled packet transmission is complete, the egress port is made available for non-sequenced traffic. Thus, if the sequenced packet transmission does not utilize the entire appointment, the remainder of the appointment is available for non-sequenced traffic.

Sometimes, an endpoint does not utilize every appointment, i.e. there may be appointments during which the endpoint does not send any packets. The sequenced switch 118-128 detects this lack of packets. A portion of the beginning of each appointment is designated a "guard band." If no packet starts arriving during the guard band, the sequenced switch assumes no packet was sent during this appointment, and the switch uses this appointment for non-sequenced traffic.

The sequencing agent 160 maintains a global database of appointments. If the sequencing agent 160 cannot schedule the appropriate egress port for the same time as the packet is expected to be received on the ingress port, the sequencing agent reserves the next available appointment on the egress port's schedule. In this case, the sequenced switch 118-128 queues the received packet between the time the packet is received on the ingress port and the appointment time on the egress port. This delay is referred to as a "phase shift."

Thus, each sequenced data flow has a reserved appointment (or plural appointments, if the packet is too large for a single appointment or if multiple packets are sent together or in rapid succession during each scheduled transmission time) at each egress port along all or part of its path between the endpoints. The sequence of (appointment, egress port) pairs for a sequenced data flow is called its "itinerary." After an itinerary is establish, as each packet in a sequenced data flow arrives at a sequenced switch 118-128, the switch transmits the packet on the appropriate egress port at the appointment time. Because sequenced packets are rarely or never placed in stochastic queues (where they would contend for service with other packets), they do not experience queuing delays, nor do they risk being dropped because a queue is full.

As noted, a non-sequenced endpoint, such as endpoint 100, does not contain logic to request the sequencing agent 160 to establish a sequenced path. Such a non-sequenced endpoint simply initiates communication to another endpoint, such as non-sequenced endpoint 108. According to one aspect of the present disclosure, the sequenced switches 118-128 are configured to classify data flows passing through the switches according to some criteria. The sequenced switches 118-128 are also configured to use a data flow's classification to selectively align the data flow with an existing or new sequence or to allow the data flow to be handled on a best-effort basis.

The classification criteria can be provided to the sequenced switches 118-128 by the sequencing agent 160. In one embodiment, the sequencing agent 160 includes a user interface 162, by which a network administrator can enter the classification criteria. In another embodiment, the sequencing agent 160 automatically determines the classification criteria, such as by monitoring traffic patterns on the network. Other embodiments can use other algorithms or heuristics executed by the sequencing agent 160, an application program executed by one of the endpoints 100-110 or another element in the network (not shown) to determine the classification criteria. Examples of classification criteria are described in more detail below. When the sequencing agent 160 provides classification criteria to the sequenced switches 118-128, the sequencing agent also establishes an itinerary that corresponds to a data flow(s) matching the classification criteria.

Figure 2:
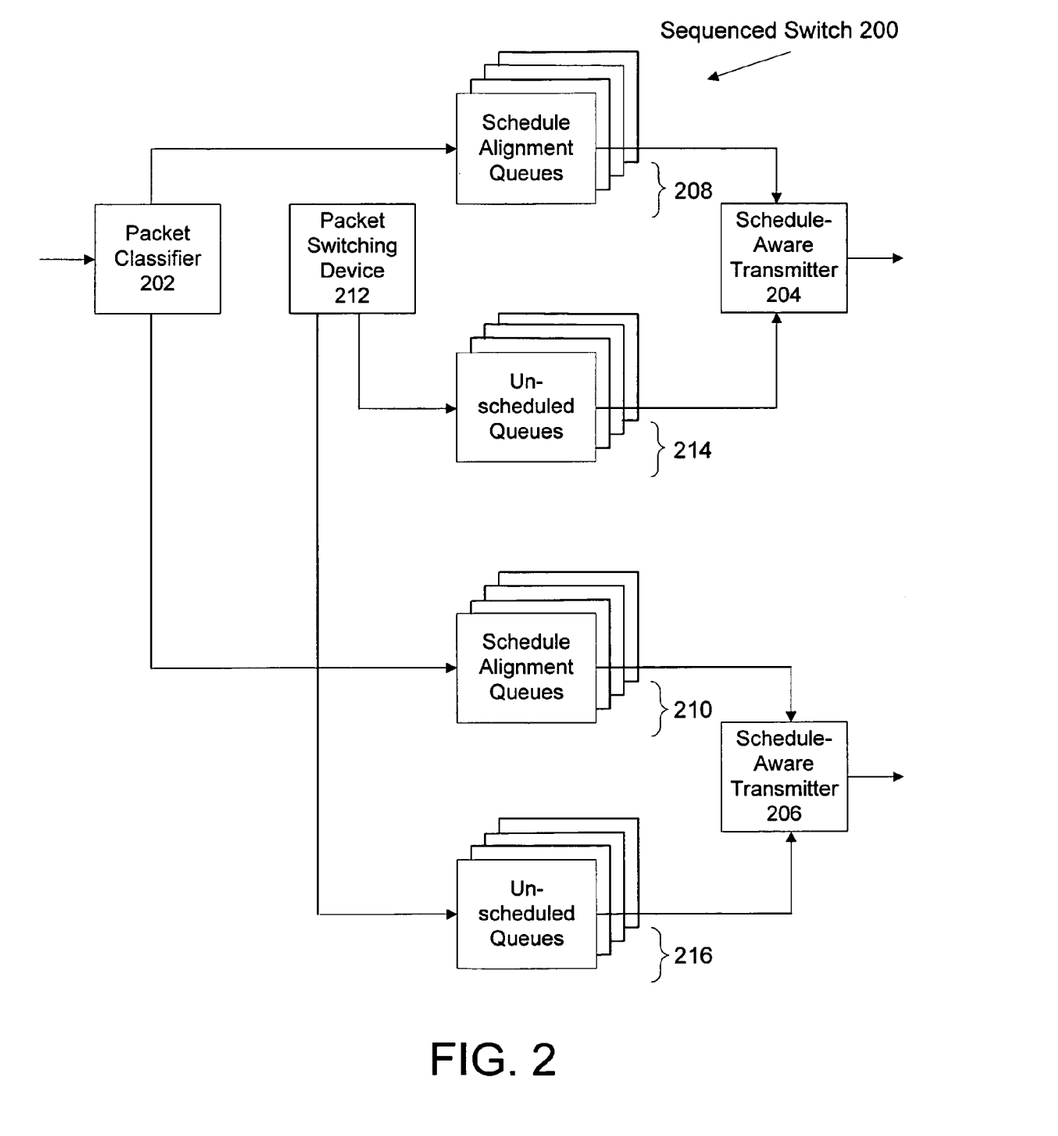
FIG. 2 is a simplified block diagram of a sequenced switch of FIG. 1.

When a packet arrives a sequenced switch 118-128, the switch classifies the packet and processes the packet accordingly. FIG. 2 is a simplified schematic block diagram of a sequenced switch 200, such as one of the sequenced switches 118-128 of FIG. 1. A packet classifier 202 classifies incoming packets, as outlined above. This classification can involve examining information within the packet for data that matches selection criteria or to form hypotheses regarding the data flow, of which this packet is a part. This packet examination can involve any layer or layers in the Open System Interconnection (OSI) protocol layer. For example, packet classification can involve examining Layer 2, such as to determine the packet type, such as Ethernet, Point-to-Point Protocol (PPP), High-level Data Link Control (HDLC), Asynchronous Transfer Mode (ATM) or Frame Relay. Packet examination can also involve Layer 3, such as to determine if the packet is (for example) an Internet Protocol (IP) or Internetwork Packet Exchange (IPX) packet. Packet examination can also involve Layer 4, such as to determine if the packet is (for example) a User Datagram Protocol (UDP) or a Transmission Control Protocol (TCP) packet. Packet examination can also occur at higher layers, e.g., OSI Layers 5, 6, and 7.

Examples of fields within the packet that can be examined include: Layer 2 source address, Layer 2 destination address, Layer 2 priority, Layer 2 virtual circuit/LAN/tunnel identifier(s), Layer 2 type field, Layer 3 source address, Layer 3 destination address, Layer 3 priority, Layer 3 virtual circuit/LAN/tunnel identifier(s), Layer 3 type field, Layer 4 source port and Layer 4 destination port. Classifications can be based on an exact match between one or more packet fields (or portions thereof) and prescribed criteria. Classifications can also be based on one or more packet fields (or portions thereof) falling within prescribed ranges of values. In addition, classifications can be based on a combination of exact matching and range matching. Furthermore, classifications can be based on logical combinations (i.e. ANDs and ORs) of several criteria. A data packet falling within any type of classification criteria or logical combination of classification criteria is referred to herein as "matching" the criteria.

Packets can be categorized according to a source-destination pair, between which the packets are sent. For example, packets be categorized according to source-destination pairs of endpoints (hosts), ports on these endpoints or application programs being executed by the endpoints. For example, consider a data flow that contains Voice-over-IP (VoIP) bearer traffic sent by one IP softphone to another IP softphone. Packets in this flow can be distinguished from packets in any other flow by the source and destination IP addresses in the IP headers and by the source and destination UDP port numbers in the UDP headers. If the source and destination IP addresses are, e.g., 135.35.31.155 and 135.35.47.189, respectively, and the source and destination UDP port numbers are 16384 and 16388, respectively, then any packet containing these four values in its IP and UDP headers is classified as belonging to this data flow ("matching the criteria").

Within data flows between pairs of endpoints, ports, etc., the data flows can also be more finely categorized. For example, UDP traffic is generally more time-sensitive than TCP traffic, thus these two types of data flows can be categorized differently. As noted with respect to FIG. 1, a network administrator can enter the classification criteria through the user interface 162, and the sequencing agent 160 can forward this selection criteria to the sequenced switch 200 (FIG. 2). By this mechanism, the network administrator can establish sequenced paths between pairs of endpoints, ports, applications, etc., by specifying source and destination addresses as the selection criteria.

Similarly, the network administrator can establish selection criteria, by which the sequenced switches 118-128 (or the sequencing agent 160 or another network element (not shown)) can automatically detect data flows that would benefit from sequenced routing through a series of switches along a path. For example, the sequenced switches 118-128 might detect time-sensitive data packets (as indicated by their protocol types or otherwise evidenced by information in the packets or elsewhere) traversing a path made up of links 132 and 142. Even if these data packets are not all sent by the same endpoints, nor destined to the same endpoints, the sequenced switches 118-128 and/or the sequencing agent 160 can group all or some of these data flows together and align them with one or more existing or new sequences.

Returning to FIG. 2, if the received packet is categorized as time-sensitive or potentially benefiting from sequenced handling, the packet is added to a schedule alignment queue that corresponds to the packet's category. Each output port has an associated schedule-aware transmitter. For simplicity, the sequenced switch 200 is shown with only two schedule-aware transmitters 204 and 206, although other embodiments can include other numbers of output ports and schedule-aware transmitters. Each schedule-aware transmitter 204 and 206 can have one or more schedule alignment queues 208 and 210, respectively. Each schedule alignment queue 208 and 210 represents a different sequence (schedule), and the schedule-aware transmitter 204 or 206 removes packets from the heads of the queues, according to the respective queues' schedules. Each schedule alignment queue 208 and 210 can correspond to a path between a pair of endpoints, ports, applications, etc. or a portion of such a path. Alternatively or in addition, each schedule alignment queue 208 and 210 can represent a different selection criteria, although packets matching more than one selection criteria can be mixed in a single queue.

The schedule alignment queues 208 and 210 are preferably sized such that they do not overflow and, thereby, cause packets to be dropped. The schedule alignment queues 208 and 210 are sized based on the type and amount of traffic expected to match their respective selection criteria. For example, it is well known by those skilled in the art that if a queue is twice the size of a maximum jitter (i.e., the maximum delay variation between packets) of a data flow, then the queue will not overflow. Typically, the maximum jitter that a flow experiences during its lifetime is not known beforehand, but the maximum jitter can be estimated. For example, jitter can be estimated by using a priori analysis or by using timestamp information contained in Real-Time Transport Protocol (RTP) headers used by applications, such as VoIP or Video-over-IP. For example, because VoIP packet flows are typically isochronous (i.e., have zero jitter) at their sources, the maximum jitter experienced by a VoIP flow is likely be less than the jitter experienced by a data flow transported using the TCP protocol. Data flows transported by the TCP protocol are typically bursty (i.e., highly jittered) at their sources. Alternatively, if queue buffer memory space is large compared to the expected number of sequenced data flows, then the queue sizes can be set to values that exceed expected maximum jitter values.

All the schedule alignment queues 208 and 210 can be of the same size, or characteristic or anticipated properties of the data flows can be used to determine appropriate queue sizes. For example, the properties of a data flow can include: source and/or destination application program type (e.g., VoIP, FTP, HTTP, Video over IP, etc.), transport protocol type (e.g., UDP or TCP), real-time v. non-real-time, burstiness of packet rate and QoS attributes (e.g., delay, jitter, packet loss, etc.), as well as considerations described above respect to classifying packets.

As noted, it may also be useful to know or be able to infer the type of application that generates or receive a data flow. Several methods can be used to infer an application's type. For example, for applications that use the Real-Time Transport Protocol (RTP), payload type information in the RTP header of the flow's packets can be used to determine the application's type. For example, if the payload type value is 34 (indicating that the payload is encoded using the H.263 video standard), then the source can be assumed to be a videoconferencing application.

Another method involves examining the TCP/UDP port numbers within the packet. Some port number values are assigned by the Internet Assigned Numbers Authority (IANA) standards organization (www.iana.org) for use by specific applications. Port numbers that are not assigned by IANA may be used by any application, but often applications limit the port numbers they use to some small range of values. Therefore, knowledge of an application's port number usage rules may also be applied to identifying the application type that generates a data flow.

Packets that are not classified into a schedule-aligned queue 208 or 210 are forwarded by the packet classifier 202 to a packet switching device 212, such as a switch, router, hub or similar device. The packet switching device 212 forwards these non-sequenced packets based on one or more header addresses in the respective packets and, optionally, based on one or more other packet fields. One of ordinary skill in this art will recognize this function as a conventional routing function. The packet switching device 212 places these packets in one or more unscheduled queues 214 and 216 associated with the respective schedule-aware transmitters 204 and 206. The schedule-aware transmitters 204 and 206 process packets on the unscheduled queues 214 and 216 on a best-efforts basis, such as during appointment times that are not reserved for any sequenced data flow and during unused reserved appointments.

As noted, the schedule-aware transmitters 204 and 206 transmit packets of sequenced data flows at reserved schedule times. The schedule-aware transmitters 204 and 206 also transmit non-scheduled packets during periods when there is no conflict with scheduled packet transmissions. The schedule-aware transmitter 204 or 206 should, therefore, finish transmitting a non-scheduled packet before a reserved time for a scheduled packet, unless it is known that no scheduled packet is to be sent at the reserved schedule time.

A path between endpoints can include sequence-aware segments (comprising one or more adjacent sequenced switches) mixed with non-sequence-aware segments (comprising one or more adjacent non-sequenced switches). The classification and alignment described above can be performed independently for each sequence-aware segment. For example, returning to FIG. 1, assume non-sequenced endpoint 100 initiates a data flow to non-sequenced endpoint 108 over a path made up of links 138, 140, 142, 146, 148, 150, 152, 154 and 156. This path includes two sequence-aware segments: a first segment made up of links 142 and 146 and a second segment made up of links 152 and 154. (Similarly, sequenced endpoint 102 can initiate a data flow to another sequenced endpoint 110 over a path made up of links 130, 132, 146, 148, 150, 152, 154 and 158. Such a path also includes two sequence-aware segments separated by at least one non-sequenced switch 114 and 116.) Each of these sequence-aware segments can be managed by a separate sequencing agent, or both segments can be managed by a common sequencing agent.

Because the two sequence-aware segments are separated by at least one non-sequenced switch 114 and 116, packet traversal times through these non-sequenced switches cannot be predicted, and the schedules of the two sequence-aware segments cannot be coordinated with each another.

Figure 3:
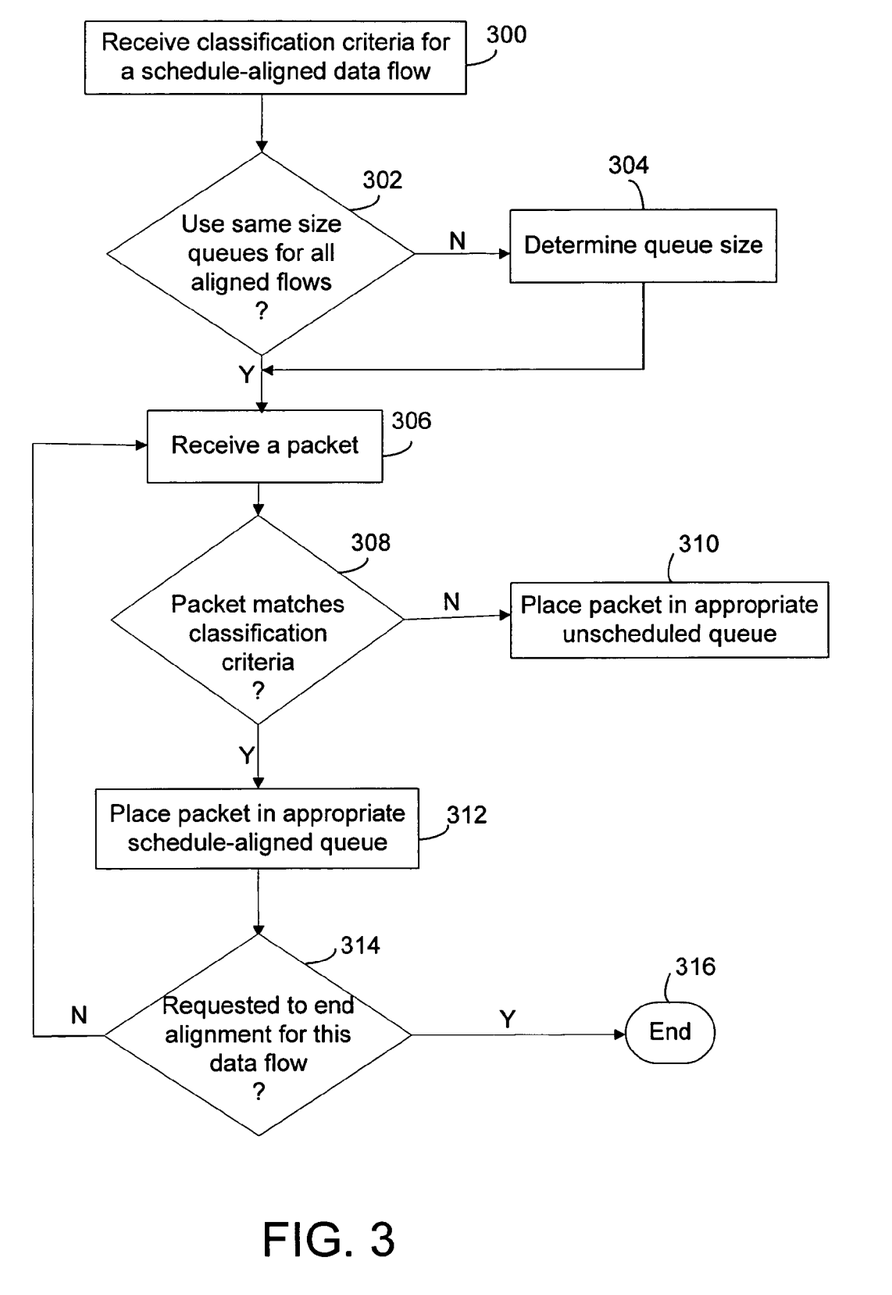
FIG. 3 is a simplified flow diagram of a method of operating the sequenced switch of FIGS. 1 and 2.

A method of operating an embodiment of the presently disclosed system is illustrated in a simplified flow chart shown in FIG. 3. At 300, classification criteria are received, such as from a network administrator or from the sequencing agent. It should be noted that many sets of classification criteria, each corresponding to a sequenced data flow, can be received over time. Alternatively or in addition, the classification criteria can be automatically generated. For example, the sequenced switches 118-122, the sequencing agent 160 or another network element can monitor packets flowing through the network to detect packets that might benefit from sequenced routing. For example, packets that include Real-Time Transport Protocol (RTP) headers, UDP traffic or that are generated by a time-sensitive applications are candidates for sequenced routing. If the network element detects one or more of these packets, such as within a predetermined amount of time, the network element can examine the packets for some common identifying characteristic(s), such as one or more fields that have similar or identical contents among the packets of the data flow. The element can then generate classification criteria from some or all of these identifying characteristics.

If all schedule alignment queues are to be of the same size, control passes from decision point 302 to 306. However, if not all queues are to be of the same size, control passes to 304, where a queue size is determined for the sequenced data flow associated with the received classification criteria. If the sequenced data flow is to use an existing schedule alignment queue, and that queue is already of sufficient size, no further queue adjustments are necessary. On the other hand, if it is determined that the queue size should be increased to accommodate the additional sequenced data flow, the queue size is adjusted at 304.

A packet is received at 306. At 308, if the packet matches some classification criteria, control passes to 312, where the packet is placed in a schedule-alignment queue that corresponds to the packet's classification. On the other hand, if the packet does not meet any of the classification criteria for sequenced handling, control passes to 310, when the packet is placed in an unscheduled queue based on packet header addresses and optionally other packet fields.

At 314, if a request is received to end schedule alignment for this data flow, control passes to 316, where the classification criteria for this data flow is deleted. Alternatively, if no traffic of a particular classification is detected for a predetermined period of time, schedule alignment for the corresponding data flow can be automatically ended On the other hand, if no request is received to end schedule alignment for this data flow, and the schedule alignment is not automatically ended, control passes back to 306 to await receipt of another packet.

It will be appreciated by those of ordinary skill in the art that modifications to, and variations of, the above-described system and method for schedule aligning a data flow can be made without departing from the inventive concepts disclosed herein. For example, a sequenced switch can be implemented in part or in whole using hardware components, such as host transmitters and receivers controlled by transmit and receive control logic and connected to transmit and receive packet queues, controlled by one or more microprocessors executing software or firmware stored in a memory, and interconnected by a crosspoint matrix. The sequenced switches and the sequencing agent can also be implemented in software, firmware, hardware or any combination thereof. Those skilled in the art should readily appreciate that programs defining the functions of the present invention can be delivered to a computer in many forms, including, but not limited to: information permanently stored on non-writable storage media (such as read only memory devices within a computer such as ROM or CD-ROM disks readable by a computer I/O attachment); information alterably stored on writable storage media (such as floppy disks and hard drives); or information conveyed to a computer through communication media, such as via baseband signaling or broadband signaling techniques, including carrier wave signaling techniques, such as over computer or telephone networks via a modem. Accordingly, the invention should not be viewed as limited except by the scope and spirit of the appended claims.

What is claimed is:

1. A method of automatically switching time-sensitive data packets, comprising:
   providing classification criteria;
   receiving a data packet;
   classifying the data packet according to the classification criteria; and if the received data packet is classified as being time-sensitive, aligning the received data packet to a sequenced data flow, and wherein aligning the received data packet to a sequenced data flow comprises enqueuing the data packet to queue that corresponds to the classification of the data packet, wherein aligning the received data packet to a sequenced data flow further comprises determining a size of the queue based on an amount of traffic expected to be classified as the received data packet is classified, and wherein aligning the received data packet to a sequenced data flow further comprises determining a size of the queue based on an estimate of an amount of jitter in a data flow.

2. The method of claim 1, wherein classifying the data packet further comprises comparing at least some of the contents of the data packet to at least some of the classification criteria and wherein a match between the at least some of the contents of the data packet and the at least some of the received classification criteria indicates the packet is classified as being time-sensitive.

3. The method of claim 1, wherein classifying the data packet comprises examining at least some contents of the data packet.

4. The method of claim 3, wherein examining contents of the data packet comprises examining at least one of a Layer 2 source address, a Layer 2 destination address, a Layer 2 priority, a Layer 2 virtual circuit/LAN/tunnel identifier, a Layer 2 type field, a Layer 3 source address, a Layer 3 destination address, a Layer 3 priority, a Layer 3 virtual circuit/LAN/tunnel identifier, a Layer 3 type field, a Layer 4 source port and a Layer 4 destination port.

5. The method of claim 1, wherein classifying the data packet further comprises comparing a destination identifier in the packet to at least some of the classification criteria.

6. The method of claim 1, wherein classifying the data packet further comprises comparing a source and a destination identifier in the packet to at least some of the classification criteria.

7. The method of claim 1, wherein classifying the data packet comprises determining a type of the packet.

8. The method of claim 7, wherein determining the type of the packet comprises determining whether the packet is one of an Ethernet, a Point-to-Point Protocol, a High-level Data Link Control, an Asynchronous Transfer Mode and a Frame Relay packet type.

9. The method of claim 7, wherein determining the type of the packet comprises determining whether the packet is one of an Internet Protocol and a Internetwork Packet Exchange packet type.

10. The method of claim 7, wherein determining the type of the packet comprises determining whether the packet is one of a User Datagram Protocol and a Transmission Control Protocol packet type.

11. The method of claim 1, wherein classifying the data packet comprises classifying the data packet as being time-sensitive if a voice over IP application generated the data packet.

12. The method of claim 1, wherein classifying the data packet comprises classifying the data packet as being time-sensitive if a video over IP application generated the data packet.

13. The method of claim 1, wherein classifying the data packet comprises classifying the data packet as being time-sensitive if the data packet is a Real-Time Transport Protocol (RTP) packet.

14. The method of claim 1, wherein classifying the data packet comprises inferring an application type of an application that sent the data packet.

15. The method of claim 14, wherein inferring the application type comprises examining at least some contents of the data packet.

16. The method of claim 15, wherein examining at least some contents of the data packet comprises examining payload type information in the data packet.

17. The method of claim 15, wherein examining at least some contents of the data packet comprises examining a port number in the data packet.

18. The method of claim 1, wherein classifying the data packet comprises obtaining information about a source of the data packet.

19. The method of claim 1, wherein classifying the data packet comprises obtaining information about a destination of the data packet.

20. The method of claim 1, wherein classifying the data packet comprises using network traffic statistics.

21. The method of claim 20, wherein using network traffic statistics comprises measuring at least one parameter of a data flow.

22. The method of claim 21, wherein measuring the at least one parameter comprises measuring a parameter selected from a list comprising burstiness, delay, jitter and packet loss.

23. The method of claim 1, wherein providing the classification criteria comprises receiving the classification criteria via a user interface.

24. The method of claim 1, wherein providing the classification criteria comprises receiving the classification criteria from a sequencing agent.

25. The method of claim 1, wherein providing the classification criteria comprises receiving the classification criteria from an application program.

26. The method of claim 1, wherein providing the classification criteria comprises generating the classification criteria based on measurements of network traffic.

27. The method of claim 1, wherein aligning the received data packet to a sequenced data flow comprises scheduling at least one appointment at least one switch for subsequent data packets that are classified as the received data packet is classified.

28. Apparatus for automatically switching time-sensitive data packets, comprising:
- a packet switching device;
- at least one schedule alignment queue; and
- a data packet classifier configured to:
  - classify received data packets according to classification criteria; and
  - if a received data packets is not classified as being time-sensitive,
  - forward the data packets to the packet switching device; and
  - if the received data packet is classified as being time-sensitive, forward the data packet to one of the at least one schedule alignment queue, and wherein the received data packet is aligned to a sequenced data flow comprising enqueuing the data packet to queue that corresponds to the classification of the data packet, wherein aligning the received data packet to a sequenced data flow further comprises determining a size of the queue based on an amount of traffic expected to be classified as the received data packet is classified, and wherein aligning the received data packet to a sequenced data flow further comprises determining a size of the queue based on an estimate of an amount of jitter in a data flow.

29. The apparatus of claim 28, further comprising at least one schedule-aware transmitter configured to dequeue data packets from at least one of the at least one schedule alignment queue and transmit the dequeued data packets according to a schedule.

30. The apparatus of claim 29, further comprising a sequencing agent configured to establish the schedule.

31. The apparatus of claim 29, further comprising a sequencing agent configured to provide the classification criteria.

32. The apparatus of claim 31, further comprising a user interface connected to the sequencing agent configured to receive the classification criteria.

33. The method of claim 1 wherein said estimate of an amount of jitter in a data flow comprises using timestamp information contained in Real-Time Transport Protocol (RTP) headers used by applications relating to said data flow.

34. The apparatus of claim 28 wherein said estimate of an amount of jitter in a data flow comprises using timestamp information contained in Real-Time Transport Protocol (RTP) headers used by applications relating to said data flow.

* * * * *